(12) United States Patent
Miyago

(10) Patent No.: US 12,345,586 B2
(45) Date of Patent: Jul. 1, 2025

(54) ROTARY MEMBER INSPECTION METHOD AND ROTARY MEMBER INSPECTION APPARATUS

(71) Applicant: SUBARU CORPORATION, Tokyo (JP)

(72) Inventor: Masazumi Miyago, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 251 days.

(21) Appl. No.: 18/328,148

(22) Filed: Jun. 2, 2023

(65) Prior Publication Data

US 2023/0408352 A1 Dec. 21, 2023

(30) Foreign Application Priority Data

Jun. 13, 2022 (JP) .................................. 2022-095005

(51) Int. Cl.
G01L 3/04 (2006.01)
G01M 15/04 (2006.01)

(52) U.S. Cl.
CPC ............. G01L 3/04 (2013.01); G01M 15/046 (2013.01)

(58) Field of Classification Search
CPC ....... G01L 3/04; G01M 15/046; G01M 13/00; G01M 13/025
See application file for complete search history.

(56) References Cited

U.S. PATENT DOCUMENTS 11,594,081 B2 * 2/2023 Stephens ................. F01L 1/047
11,946,827 B2 * 4/2024 Stephens ............. G01M 13/003

FOREIGN PATENT DOCUMENTS

JP H11-281532 A 10/1999

* cited by examiner

*Primary Examiner* — Freddie Kirkland, III
(74) *Attorney, Agent, or Firm* — Rimon P.C.

(57) ABSTRACT

A rotary member inspection method of inspecting a rotation operation of a rotary member configured to rotate about a rotation shaft includes: causing the rotary member to perform forward rotation and thereafter perform reverse rotation; acquiring one or both of a difference value between a rotating torque at a time of the forward rotation of the rotary member and a rotating torque at a time of the reverse rotation of the rotary member, and an inertia force at a time of switching from the forward rotation to the reverse rotation of the rotary member; and determining whether a rotation failure of the rotary member is present based on one or both of the acquired difference value and the acquired inertia force and a threshold set in advance.

7 Claims, 4 Drawing Sheets

ROTARY MEMBER INSPECTION METHOD AND ROTARY MEMBER INSPECTION APPARATUS

CROSS-REFERENCE TO RELATED APPLICATIONS

The present application claims priority from Japanese Patent Application No. 2022-095005 filed on Jun. 13, 2022, the entire contents of which are hereby incorporated by reference.

BACKGROUND

The disclosure relates to a rotary member inspection method of inspecting a rotation operation of a rotary member configured to rotate about a rotation shaft, and to a rotary member inspection apparatus that inspects a rotation operation of a rotary member configured to rotate about a rotation shaft.

A rotary member that rotates about a rotation shaft, such as a camshaft which is a part of an engine, performs a rotation operation and thereby helps to allow for opening and closing of an intake valve and an exhaust valve at appropriate timings. It may be desired that such a rotary member rotate smoothly with less resistance in terms of fuel economy.

As a method of inspecting whether a rotary member rotates smoothly, Japanese Unexamined Patent Application Publication (JP-A) No. H11-281532 discloses an inspection method including: detecting a rotating torque at a time when a camshaft as the rotary member is rotated; and determining whether a rotation operation of the camshaft is normal with use of the detected rotating torque.

In this inspection method, the camshaft as the rotary member is forcefully rotated, and a torque detector detects a lower limit of the rotating torque of the camshaft. Thereafter, the lower limit detected by the torque detector and a set lower limit set in advance are compared with each other. If the detected lower limit is greater than the set lower limit, a driving valve system including the camshaft is determined as being abnormal.

This inspection method makes it possible to detect whether a rotation operation failure is present in a simple way by comparing the lower limit of the rotating torque and the set lower limit set in advance.

SUMMARY

An aspect of the disclosure provides a rotary member inspection method of inspecting a rotation operation of a rotary member. The rotary member is configured to rotate about a rotation shaft. The rotary member inspection method includes: causing the rotary member to perform forward rotation and thereafter perform reverse rotation; acquiring one or both of a difference value between a rotating torque at a time of the forward rotation of the rotary member and a rotating torque at a time of the reverse rotation of the rotary member, and an inertia force at a time of switching from the forward rotation to the reverse rotation of the rotary member; and determining whether a rotation failure of the rotary member is present based on one or both of the acquired difference value and the acquired inertia force and a threshold set in advance.

An aspect of the disclosure provides a rotary member inspection apparatus configured to inspect a rotation operation of a rotary member. The rotary member is configured to rotate about a rotation shaft. The rotary member inspection apparatus includes a driving unit, a detector, and a determination unit. The driving unit is configured to cause the rotary member to rotate in a forward rotation direction and a reverse rotation direction. The detector is configured to detect one or both of a rotating torque of the rotary member and an inertia force of the rotary member. The determination unit is configured to determine whether a rotation failure of the rotary member is present based on one or both of a difference value between a rotating torque at a time of forward rotation of the rotary member and a rotating torque at a time of reverse rotation of the rotary member, and an inertia force at a time of switching from the forward rotation to the reverse rotation of the rotary member. The difference value is acquired based on values detected by the detector. The inertia force at the time of the switching from the forward rotation to the reverse rotation of the rotary member is acquired based on values detected by the detector.

An aspect of the disclosure provides a rotary member inspection apparatus configured to inspect a rotation operation of a rotary member. The rotary member is configured to rotate about a rotation shaft. The rotary member inspection apparatus includes a motor, a torque transducer, and circuitry. The motor is configured to cause the rotary member to rotate in a forward rotation direction and a reverse rotation direction. The torque transducer is configured to detect one or both of a rotating torque of the rotary member and an inertia force of the rotary member. The circuitry is configured to determine whether a rotation failure of the rotary member is present based on one or both of a difference value between a rotating torque at a time of forward rotation of the rotary member and a rotating torque at a time of reverse rotation of the rotary member, and an inertia force at a time of switching from the forward rotation to the reverse rotation of the rotary member. The difference value is acquired based on values detected by the torque transducer. The inertia force at the time of the switching from the forward rotation to the reverse rotation of the rotary member is acquired based on values detected by the torque transducer.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
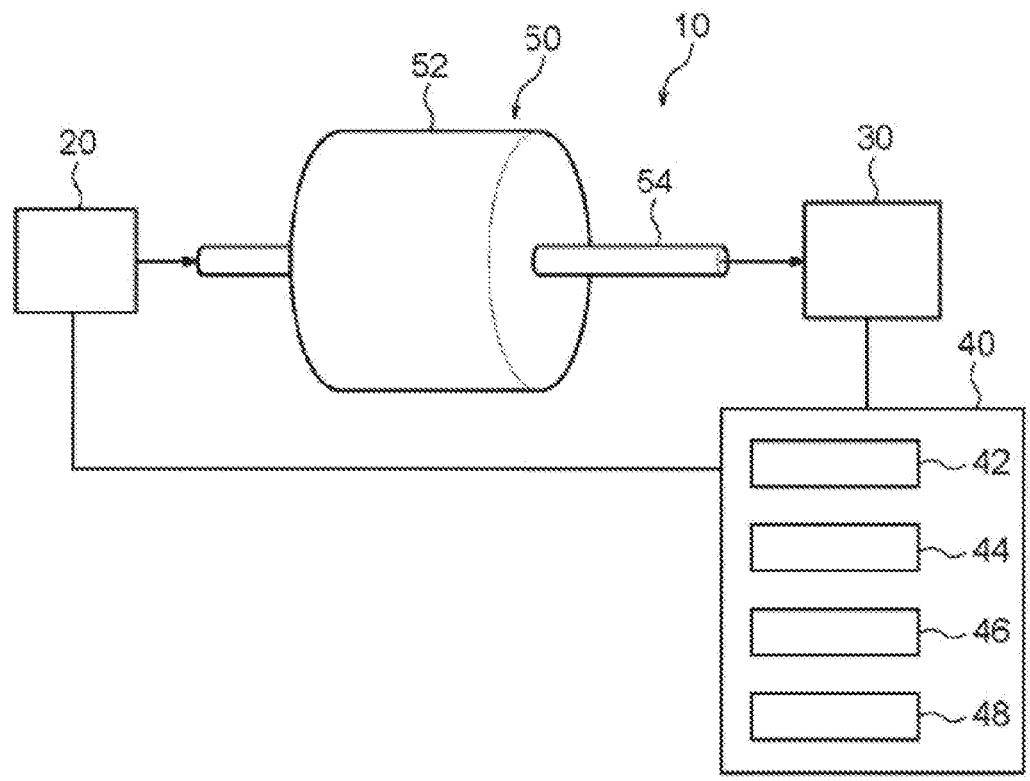
FIG. 1 is a schematic explanatory diagram illustrating an inspection apparatus, for a rotary member, according to one example embodiment of the disclosure.

In an existing method in which a determination is made based on a lower limit of a rotating torque as a reference, a difference in rotating torque between a normal member and a defective member is small. It is therefore sometimes difficult to make an accurate determination when the rotating torque includes a noise due to an influence of disturbance.

It is desirable to provide a rotary member inspection method and a rotary member inspection apparatus that each make it possible to accurately detect whether a rotation failure of a rotary member is present.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 is a schematic explanatory diagram illustrating an inspection apparatus 10, for a rotary member 50, according to an example embodiment of the disclosure. The inspection apparatus 10 may inspect a rotation operation of the rotary member 50 that rotates about a rotation shaft 54. For example, the inspection apparatus 10 may inspect, when the rotary member 50 is rotated at a predetermined rotation speed, whether the rotary member 50 is a normal member that smoothly rotates with a small rotation load or a defective member having a great rotation load.

In the example embodiment, the rotary member 50 to be inspected may include a body 52 and the rotation shaft 54. The body 52 may have a cylindrical shape. The rotation shaft 54 may run through a central axis of the body 52. The rotation shaft 54 may be a straight-rod-shaped member. The body 52 may be permanently affixed to the rotation shaft 54. The rotary member 50 is not limited in material, and may include, for example, any of various materials including, without limitation, a metal material and a resin material. In addition, the body 52 and the rotation shaft 54 may be different in material from each other. The body 52 may include a material having a constant density.

The inspection apparatus 10 may include, for example but not limited to, a motor 20, a torque detector 30, and a control device 40. The motor 20 may cause the rotary member 50 to rotate. The motor 20 may be configured to cause the rotary member 50 to rotate in a forward rotation direction and a reverse rotation direction. Upon an inspection of the rotary member 50, the rotation shaft 54 of the rotary member 50 may be coupled to the motor 20. In one embodiment, the motor 20 may serve as a "driving unit".

The torque detector 30 may detect a rotating torque. For example, the torque detector 30 may be a torque transducer. The torque detector 30 may be coupled to the rotation shaft 54 of the rotary member 50. In the example embodiment, when the rotary member 50 is rotated, the torque detector 30 may substantially constantly detect a rotating torque of the rotary member 50. In one embodiment, the torque detector 30 may serve as a "detector".

The control device 40 may include, for example, an information processor, a storage, an input/output interface, and any other component. Non-limiting examples of the information processor may include a central processing unit (CPU) and an application specific integrated circuit (ASIC). Non-limiting examples of the storage may include a random-access memory (RAM) and a read-only memory (ROM). The control device 40 may be electrically coupled to the motor 20 and the torque detector 30. The control device 40 may control driving of the motor 20, and may determine whether a rotation failure of the rotary member 50 is present based on data related to a rotating torque received from the torque detector 30. As illustrated in FIG. 1, the control device may include a storage unit 42, a calculation unit 44, a determination unit 46, and a display unit 48.

The storage unit 42 of the control device 40 may store, for example, a program for controlling the motor 20 and the torque detector 30 coupled to the control device 40. The storage unit 42 may also store a torque threshold $T_{th}$ and an inertia force threshold $I_{th}$ to be references based on which a determination related to the rotation failure of the rotary member 50 is made. The torque threshold $T_{th}$ and the inertia force threshold $I_{th}$ may be set in advance.

The calculation unit 44 may calculate a difference value between a rotating torque at a time of forward rotation of the rotary member 50 and a rotating torque at a time of reverse rotation of the rotary member 50, based on the rotating torque detected by the torque detector 30. In the example embodiment, the control device 40 may substantially constantly receive data related to the rotating torque from the torque detector 30. The calculation unit 44 may calculate the difference value between the rotating torque at the time of the forward rotation and the rotating torque at the time of the reverse rotation from the received data related to the rotating torque.

Figure 2:
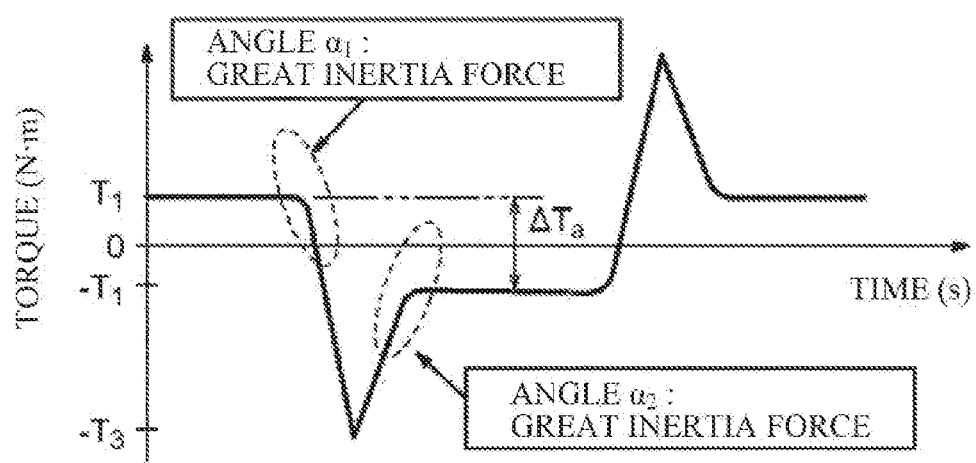
FIG. 2 is a graph illustrating a temporal change in rotating torque in a case where a rotary member is a normal member.
Figure 3:
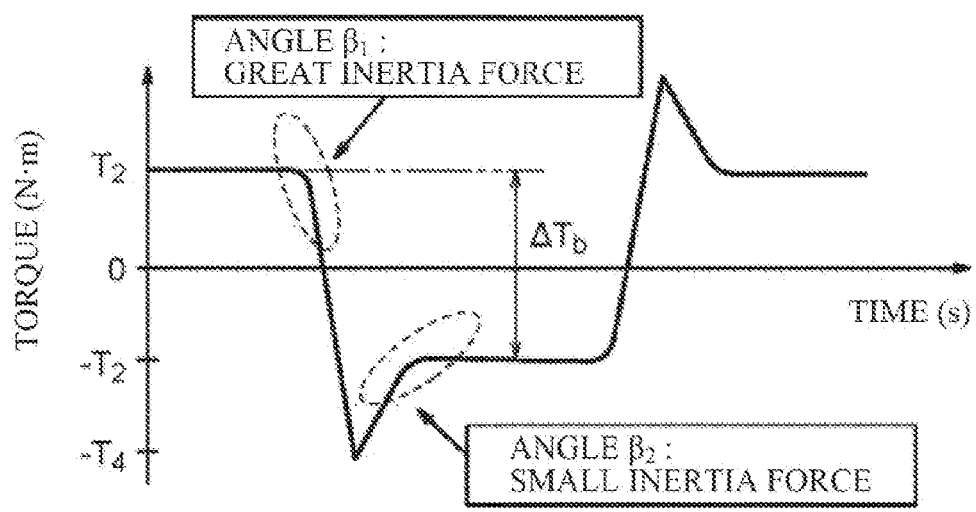
FIG. 3 is a graph illustrating a temporal change in rotating torque in a case where the rotary member is a defective member.

FIGS. 2 and 3 are each a graph illustrating a temporal change in the rotating torque of the rotary member 50 and each illustrate an example case in which the rotary member 50 is caused to perform the forward rotation, thereafter perform the reverse rotation, and thereafter perform the forward rotation again. FIG. 2 illustrates a graph related to a normal member in which the rotary member 50 has a small rotation load. FIG. 3 illustrates a graph related to a defective member in which the rotary member 50 has a great rotation load. The inspection apparatus 10 may cause the rotary member 50 to continuously perform the forward rotation and the reverse rotation by the driving of the motor 20. As illustrated in FIGS. 2 and 3, the rotating torque may greatly change when a rotation direction of the rotary member 50 is changed. For this reason, the calculation unit 44 may adopt a rotating torque in a stable state after a predetermined time elapses from a timing when the rotary member 50 is caused to rotate in the forward rotation direction or the reverse rotation direction, and may thereby calculate the difference value.

In the example illustrated in FIG. 2, the calculation unit 44 may calculate a difference value $\Delta T_a$ from a rotating torque $T_1$ at the time of the forward rotation and a rotating torque $-T_1$ at the time of the reverse rotation, where $T_1$ is a positive value. When the rotating torque detected by the torque detector 30 includes a noise $N_1$ due to a disturbance factor, the detected rotating torque at the time of the forward rotation may be $(T_1+N_1)$, and the detected rotating torque at the time of the reverse rotation may be $(-T_1+N_1)$. The difference value $\Delta T_a$ calculated from the rotating torques detected by the torque detector 30 may be as follows:

$$\Delta T_a=(T_1+N_1)-(-T_1+N_1)=2T_1.$$

An influence of the noise $N_1$ may thus be excluded.

In the example illustrated in FIG. 3, the calculation unit 44 may calculate a difference value $\Delta T_b$ from a rotating torque $T_2$ at the time of the forward rotation and a rotating torque $-T_2$ at the time of the reverse rotation, where $T_2$ is a positive value and is greater than $T_1(T_1<T_2)$. When the rotating torque detected by the torque detector 30 includes a noise $N_2$ due to a disturbance factor, the detected rotating torque at the time of the forward rotation may be $(T_2+N_2)$, and the detected rotating torque at the time of the reverse rotation may be $(-T_2+N_2)$. The difference value $\Delta T_b$ calculated from the rotating torques detected by the torque detector 30 may be as follows:

$$\Delta T_b=(T_2+N_2)-(-T_2+N_2)=2T_2.$$

An influence of the noise $N_2$ may thus be excluded.

In addition, the calculation unit 44 may calculate an inertia force of the rotary member 50, based on the rotating torque detected by the torque detector 30. A value of the inertia force may be calculated, for example, by calculating a second order derivative of a change in the rotating torque with respect to time. The calculation unit 44 may further calculate an inertia force difference, i.e., a difference value between an inertia force immediately before switching from the forward rotation to the reverse rotation of the rotary member 50 and an inertia force immediately after the switching.

In the graphs illustrated in FIGS. 2 and 3, the switching from the forward rotation to the reverse rotation of the rotary member 50 may be performed at a time point corresponding to a rotating torque $-T_3$ and at a time point corresponding to a rotating torque $-T_4$. $T_3$ and $T_4$ may each be a positive value greater than $T_2$. In FIG. 2, the inertia force immediately before the switching from the forward rotation to the reverse rotation of the rotary member 50 may be an inertia force at a time when the rotating torque rapidly decreases from the rotating torque $T_1$, indicated by a portion surrounded by a dashed line. The inertia force immediately after the switching may be an inertia force at a time when the rotating torque reaches $-T_1$ after increasing from the rotating torque $-T_3$, indicated by another portion surrounded by a dashed line. In FIG. 3, the inertia force immediately before the switching from the forward rotation to the reverse rotation of the rotary member 50 may be an inertia force at a time when the rotating torque rapidly decreases from the rotating torque $T_2$, indicated by a portion surrounded by a dashed line. The inertia force immediately after the switching may be an inertia force at a time when the rotating torque reaches $-T_2$ after increasing from the rotating torque $-T_4$, indicated by another portion surrounded by a dashed line.

If the rotary member 50 is a defective member having a great rotation load, the inertia force immediately after the switching from the forward rotation to the reverse rotation may not be present or may have a small value. In other words, in the defective member, an absolute value of the inertia force immediately after the switching from the forward rotation to the reverse rotation may be smaller than that of a normal member. Such a difference in magnitude of the inertia force may be seen from that an angle $\beta_2$ immediately after the switching of the rotation direction indicated by the portion surrounded by the dashed line in FIG. 3 is greater than an angle $\beta_1$ immediately before the switching of the rotation direction indicated by the portion surrounded by the dashed line in FIG. 3, an angle $\alpha_1$ immediately before the switching of the rotation direction indicated by the portion surrounded by the dashed line in FIG. 2, and an angle $\alpha_2$ immediately after the switching of the rotation direction indicated by the portion surrounded by the dashed line in FIG. 2.

In the example embodiment, for example, it may be assumed that the inertia force difference is nearly equal to an amount of change in rotating torque. The calculation unit 44 may calculate the difference between the inertia force immediately before the switching of the rotation direction and the inertia force immediately after the switching of the rotation direction based on such an assumption.

For example, regarding the rotary member 50 in the case of FIG. 2, when the rotating torque detected by the torque detector 30 includes the noise $N_1$ due to a disturbance factor, an amount of change in the rotating torque immediately before the switching from the forward rotation to the reverse rotation may be as follows:

$$(T_1+N_1)-((-T_3)+N_1)=T_1+T_3.$$

When the rotating torque detected by the torque detector 30 includes the noise $N_1$ due to a disturbance factor, an amount of change in the rotating torque immediately after the switching from the forward rotation to the reverse rotation may be as follows:

$$(-T_3+N_1)-((-T_1)+N_1)=T_1-T_3.$$

Based upon the two equations above, the difference value between the inertia force immediately before the switching from the forward rotation to the reverse rotation of the rotary member 50 and the inertia force immediately after the switching may be as follows:

$$(T_1+T_3)+(T_1-T_3)=2T_1.$$

In a similar manner, regarding the rotary member 50 in the case of FIG. 3, when the rotating torque detected by the torque detector 30 includes the noise $N_2$ due to a disturbance factor, an amount of change in the rotating torque immediately before the switching from the forward rotation to the reverse rotation may be as follows:

$$(T_2+N_2)-((-T_4)+N_2)=T_2+T_4.$$

When the rotating torque detected by the torque detector 30 includes the noise $N_2$ due to a disturbance factor, an amount of change in the rotating torque immediately after the switching from the forward rotation to the reverse rotation may be as follows:

$$(-T_4+N_2)-((-T_2)+N_2)=T_2-T_4.$$

Based upon the two equations above, the difference value between the inertia force immediately before the switching from the forward rotation to the reverse rotation of the rotary member 50 and the inertia force immediately after the switching may be as follows:

$$(T_2+T_4)+(T_2-T_4)=2T_2.$$

The determination unit 46 may determine whether the rotation failure of the rotary member 50 is present based on: the difference value between the rotating torque at the time of the forward rotation of the rotary member 50 and the rotating torque at the time of the reverse rotation of the rotary member 50, calculated by the calculation unit 44 based on the detected values obtained by the torque detector 30; and the difference value between the inertia force immediately before the switching from the forward rotation to the reverse rotation of the rotary member 50 and the inertia force immediately after the switching, calculated by the calculation unit 44 based on the detected values obtained by the torque detector 30.

The determination unit 46 may compare the difference value between the rotating torques calculated by the calculation unit 44 with the torque threshold $T_{th}$ stored in the storage unit 42. If the difference value is less than or equal to the torque threshold $T_{th}$, the determination unit 46 may determine that the rotation of the rotary member 50 is normal. If the difference value is greater than the torque threshold $T_{th}$, the determination unit 46 may determine that the rotation failure of the rotary member 50 is present. In addition, the determination unit 46 may compare the inertia force difference calculated by the calculation unit 44 with the inertia force threshold $I_{th}$ stored in the storage unit 42. If the inertia force difference is less than or equal to the inertia force threshold $I_{th}$, the determination unit 46 may determine that the rotation of the rotary member 50 is normal. If the inertia force difference is greater than the inertia force threshold $I_{th}$, the determination unit 46 may determine that the rotation failure of the rotary member 50 is present.

The display unit 48 may present information in one or both of a visual manner and an auditory manner. For example, the display unit 48 may include, for example but not limited to, a display and a speaker. For example, the calculation unit 44 may display a calculation result obtained by the calculation unit 44 and a determination result obtained by the determination unit 46. In the example embodiment, when the determination unit 46 determines that the rotation of the rotary member 50 is normal regarding both the difference value between the rotating torques and the inertia force difference, the display unit 48 may display a determination result indicating that the rotary member 50 is normal. When the determination unit 46 determines that the rotation failure of the rotary member is present regarding one or both of the difference value between the rotating torques and the inertia force difference, the display unit 48 may display a determination result indicating that the rotation failure is present. In one example, the display unit 48 may also display data related to the detected rotating torque or any other information.

Figure 4:
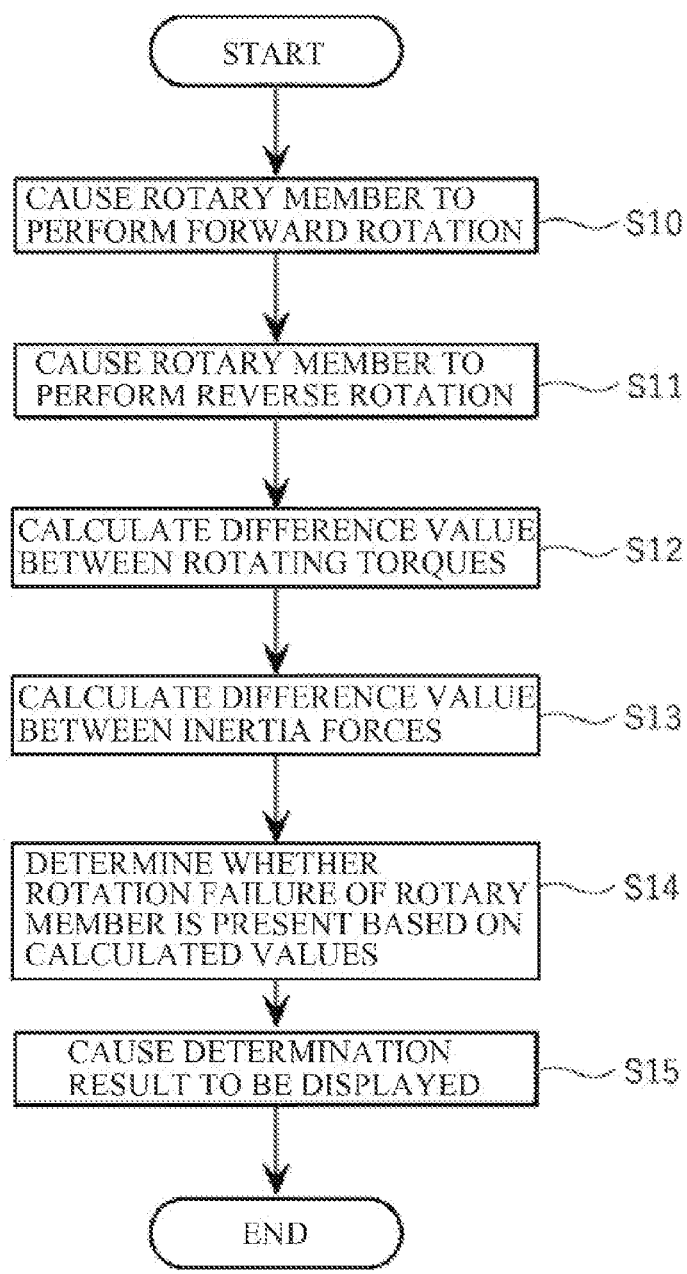
FIG. 4 is a flowchart of a rotary member inspection method to be executed with use of the inspection apparatus.

Next, a description is given of a method of inspecting the rotation operation of the rotary member 50 with use of the inspection apparatus 10 described above. FIG. 4 is a flowchart of a rotary member inspection method to be executed with use of the inspection apparatus 10.

First, the control device 40 may cause the motor 20 to operate, and may thereby cause the rotary member 50 to rotate in the forward rotation direction at a predetermined rotation speed (step S10). Thereafter, the control device 40 may continuously cause the rotary member 50 to rotate in the reverse rotation direction at the predetermined rotation speed which is substantially the same as the rotation speed in the forward rotation direction (step S11). The torque detector 30 may substantially constantly detect the rotating torque during the rotation of the rotary member 50. The torque detector 30 may supply data related to the detected rotating torque to the control device 40.

The calculation unit 44 of the control device 40 may calculate the difference value between the rotating torque at the time of the forward rotation of the rotary member 50 and the rotating torque at the time of the reverse rotation of the rotary member 50, based on the received data related to the rotating torque (step S12). In addition, the calculation unit 44 may calculate the difference value between the inertia force immediately before the switching from the forward rotation to the reverse rotation of the rotary member 50 and the inertia force immediately after the switching, based on the received data related to the rotating torque (step S13). In one embodiment, steps S10 to S13 in the inspection method of the example embodiment may serve as "acquiring one or both of a difference value between rotating torque at a time of the forward rotation of the rotary member and rotating torque at a time of the reverse rotation of the rotary member and inertia force at a time of switching from the forward rotation to the reverse rotation of the rotary member".

Thereafter, the determination unit 46 of the control device 40 may determine whether the rotation failure of the rotary member 50 is present, based on the value calculated by the calculation unit 44 (step S14). For example, the determination unit 46 may compare the calculated difference value between the rotating torques and the torque threshold $T_{th}$ set in advance with each other. If the difference value between the rotating torques is greater than the torque threshold $T_{th}$, the determination unit 46 may determine that the rotation failure of the rotary member 50 is present. If the difference value between the rotating torques is less than or equal to the torque threshold $T_{th}$, the determination unit 46 may determine that the rotation of the rotary member 50 is normal. In addition, the determination unit 46 may compare the calculated inertia force difference and the inertia force threshold $I_{th}$ set in advance. If the inertia force difference is greater than the inertia force threshold $I_{th}$, the determination unit 46 may determine that the rotation failure of the rotary member 50 is present. If the inertia force difference is less than or equal to the inertia force threshold $I_{th}$, the determination unit 46 may determine that the rotation of the rotary member 50 is normal.

When the determinations related to the difference value between the rotating torques and the inertia force difference both result in "normal" based on the comparison with the thresholds $T_{th}$ and $I_{th}$, respectively, the calculation unit 44 may determine that the rotary member 50 is a normal member. When one or both of the determinations related to the difference value between the rotating torques and the inertia force difference result in "rotation failure" based on the comparison with the thresholds $T_{th}$ and $I_{th}$, respectively, the calculation unit 44 may determine that the rotary member 50 is a defective member.

When the calculation unit 44 determines whether the rotary member 50 is a normal member or a defective member, the control device 40 may cause the display unit 48 to display a result of the determination (step S15).

In the inspection method described above, upon inspecting whether the rotation failure of the rotary member 50 is present, the difference value between the rotating torque at the time of the forward rotation and the rotating torque at the time of the reverse rotation, and the value of the inertia force generated at the time of the switching from the forward rotation to the reverse rotation may be used. This makes it possible to accurately detect whether the rotation failure of the rotary member is present.

Figure 5:
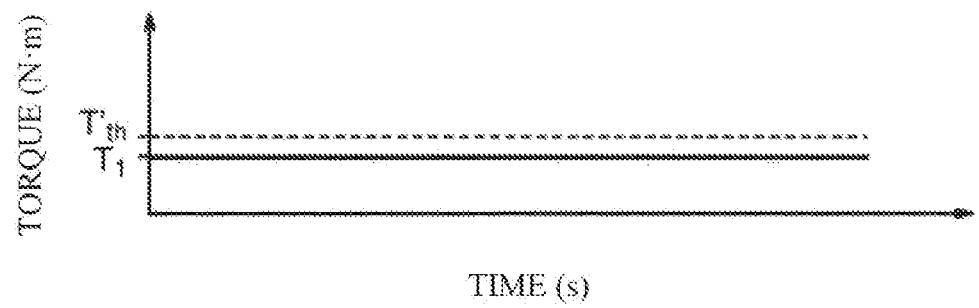
FIG. 5 is a diagram for describing an inspection method of a comparative example, and is a graph illustrating a temporal change in rotating torque in a case where the rotary member, which is a normal member, is caused to perform forward rotation.
Figure 6:
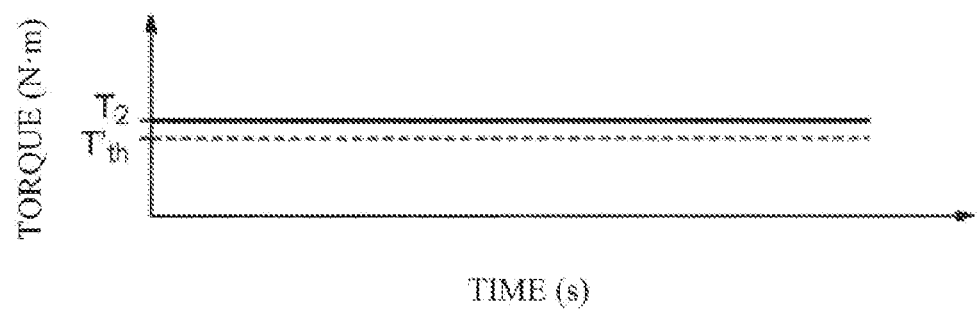
FIG. 6 is a diagram for describing the inspection method of the comparative example, and is a graph illustrating a temporal change in rotating torque in a case where the rotary member, which is a defective member, is caused to perform the forward rotation.

For example, in a method of a comparative example, a determination as to whether the rotation failure is present is made on the rotating torque at the time of the forward rotation. For example, when the rotating torque detected by the torque detector 30 includes a noise due to a disturbance factor, it may be difficult to make an accurate determination by the method of the comparative example, due to an influence of the noise. In the method of the comparative example, if the detected rotating torque is less than or equal to a threshold $T'_{th}$ set in advance, a determination is made that it is normal. If the detected rotating torque is greater than the threshold $T'_{th}$, a determination is made that the rotation failure is present. FIGS. 5 and 6 are each a graph illustrating a temporal change in the rotating torque in a case where the rotary member 50 is caused to perform the forward rotation. FIG. 5 illustrates a case where the rotary member 50 is a normal member, and FIG. 6 illustrates a case where the rotary member 50 is a defective member. Assume that the rotating torque $T_1$ of the rotary member 50 in the case of FIG. 5 is 0.2 N·m ($T_1$=0.2 (N·m)), the rotating torque $T_2$ of the rotary member 50 in the case of FIG. 6 is 0.4 N·m ($T_2$=0.4 (N·m)), and the torque threshold $T'_{th}$ to be used in the determination related to the rotation failure is 0.3 N·m ($T'_{th}$=0.3 (N·m)). When there is no influence of a noise, a difference between the rotating torque $T_1$ and the threshold $T'_{th}$ may be 0.1 N·m ($T_1-T'_{th}$=0.1 (N·m)), and a difference between the rotating torque $T_2$ and the threshold may be −0.1 N·m ($T'_{th}-T_2$=−0.1 (N·m)), which are small.

When the detected rotating torque includes a noise N due to a disturbance factor, and when the noise N is 0.3 N·m (N=0.3 (N·m)), the detected rotating torque of the rotary member 50 in the case of FIG. 5 may be 0.5 N·m ($T_1$+N=0.2+0.3=0.5 (N·m)). Accordingly, a determination may be made that the rotation failure is present, although the rotary member 50 in the case of FIG. 5 is actually a normal member. When the noise N is −0.3 N·m (N=−0.3 (N·m)), the detected rotating torque of the rotary member 50 in the case of FIG. 6 may be 0.1 N·m ($T_2$+N=0.4−0.3=0.1 (N·m)). Accordingly, the rotary member 50 may be determined as a normal member, although the rotary member 50 in the case of FIG. 6 is actually a defective member.

In contrast, in the inspection method of the example embodiment, it is possible to suppress an influence of a noise, increase a numerical difference between a normal member and a defective member, and make a highly accurate determination.

For example, assume that the rotating torque $T_1$ of the rotary member 50 in the case of FIG. 2 is 0.2 N·m ($T_1$=0.2 (N·m)), the rotating torque $T_2$ of the rotary member 50 in the case of FIG. 3 is 0.4 N·m ($T_2$=0.4 (N·m)), and the torque threshold $T'_{th}$ to be used in the determination related to the rotation failure is 0.6 N·m ($T'_{th}$=0.6 (N·m)). In this case, as described above, regarding the rotary member 50 in the case of FIG. 2, the difference value $\Delta T_a$ between the rotating torques may be 0.4 ($\Delta T_a=2T_1$=0.4), and the difference between the difference value $\Delta T_a$ and the torque threshold $T_{th}$ may be 0.2 N·m (0.6−0.4=0.2 (N·m)), regardless of a noise. As described above, regarding the rotary member 50 in the case of FIG. 3, the difference value $\Delta T_b$ between the rotating torques may be 0.8 ($\Delta T_b=2T_2$=0.8), and the difference between the difference value $\Delta T_b$ and the torque threshold $T_{th}$ may be −0.2 N·m (0.6−0.8=−0.2 (N·m)), regardless of a noise. In the inspection method of the example embodiment, it is thus possible to make a highly accurate determination by suppressing an influence of a noise and increasing a difference between the difference value and the threshold $T_{th}$ in such a manner.

In addition, in the example embodiment, making a determination using the inertia force difference makes it possible to make a further highly accurate determination. For example, assume that the inertia force threshold $I_{th}$ is 0.6 ($I_{th}$=0.6), the rotating torque $T_1$ of the rotary member 50 in the case of FIG. 2 is 0.2 N·m ($T_1$=0.2 (N·m)), the rotating torque $T_3$ of the rotary member 50 in the case of FIG. 2 is 0.8 N·m ($T_3$=0.8 (N·m)), the rotating torque $T_2$ of the rotary member 50 in the case of FIG. 3 is 0.4 N·m ($T_2$=0.4 (N·m)), and the rotating torque $T_4$ of the rotary member 50 in the case of FIG. 3 is 0.8 N·m ($T_4$=0.8 (N·m)). In this case, as described above, when it is assumed that the inertia force difference is nearly equal to the amount of change in rotating torque, the inertia force difference of the rotary member 50 in the case of FIG. 2 may be 0.4 (inertia force difference≈$2T_1$=0.4), and the difference between the inertia force difference and the inertia force threshold $I_{th}$ may be 0.2 N·m (0.6−0.4=0.2 (N·m)), regardless of a noise. As described above, the inertia force difference of the rotary member 50 in the case of FIG. 3 may be 0.8 (inertia force difference≈$2T_2$=0.8), and the difference between the inertia force difference and the inertia force threshold $I_{th}$ may be 0.2 N·m (0.6−0.8=−0.2 (N·m)), regardless of a noise. In the inspection method of the example embodiment, it is thus possible to make a highly accurate determination by suppressing an influence of a noise and increasing a difference between the inertia force difference and the threshold $I_{th}$ in such a manner.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, it may be sufficient that the inspection apparatus 10 is configured to acquire at least one of: the difference value between the rotating torque at the time of the forward rotation of the rotary member 50 and the rotating torque at the time of the reverse rotation thereof; and the inertia force immediately after the switching from the forward rotation to the reverse rotation of the rotary member 50. In such a case, the determination as to whether the rotation failure of the rotary member 50 is present may be made based on the acquired difference value between the rotating torques or the acquired inertia force. The difference value between the rotating torque at the time of the forward rotation and the rotating torque at the time of the reverse rotation may be acquired by the method of the example embodiment described above. When the determination related to the rotation failure is made based on the inertia force, if the magnitude, or the absolute value, of the inertia force immediately after the switching of the rotation is greater than the inertia force threshold set in advance, a determination may be made that it is normal. If the magnitude, or the absolute value, of the inertia force immediately after the switching of the rotation is less than or equal to the inertia force threshold, a determination may be made that it is defective.

In one example, the inertia force of the rotary member 50 may be detected by a detector configured to directly detect the inertia force, instead of the torque detector 30. The detector configured to directly detect the inertia force may be, for example but not limited to, an inertia force sensor such as an acceleration sensor.

The example embodiment has been described referring, as an example, to the method of inspecting the rotary member 50 in which the body 52 having the cylindrical shape is attached to the rotation shaft 54; however, the rotary member 50 to be inspected is not limited thereto. For example, the rotary member 50 may be a camshaft that is a part of an engine to be mounted on a vehicle. The camshaft may include a shaft serving as a rotation shaft, and cams serving as the body. In a case of inspecting a camshaft, the inspection apparatus may be configured to measure the rotating torque or the inertia force in a region where a cam lobe is not present in the rotation direction.

The control device 40 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control device 40 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control device 40 illustrated in FIG. 1.

The invention claimed is:

1. A rotary member inspection method of inspecting a rotation operation of a rotary member, the rotary member being configured to rotate about a rotation shaft, the rotary member inspection method comprising:
   causing the rotary member to perform forward rotation and thereafter perform reverse rotation;
   acquiring one or both of a difference value between a rotating torque at a time of the forward rotation of the rotary member and a rotating torque at a time of the reverse rotation of the rotary member, and an inertia force at a time of switching from the forward rotation to the reverse rotation of the rotary member; and
   determining whether a rotation failure of the rotary member is present based on one or both of the acquired difference value and the acquired inertia force and a threshold set in advance.

2. The rotary member inspection method according to claim 1, wherein
   the acquiring one or both of the difference value and the inertia force comprises acquiring the difference value between the rotating torque at the time of the forward rotation of the rotary member and the rotating torque at the time of the reverse rotation of the rotary member, and
   the determining whether the rotation failure is present comprises comparing the acquired difference value between the rotating torques and a torque threshold set in advance with each other, and, if the difference value is greater than the torque threshold, determining that the rotation failure is present.

3. The rotary member inspection method according to claim 1, wherein
   the acquiring one or both of the difference value and the inertia force comprises acquiring a difference value between an inertia force immediately before the switching from the forward rotation to the reverse rotation of the rotary member and an inertia force immediately after the switching, and
   the determining whether the rotation failure is present comprises comparing the acquired difference value between the inertia forces and an inertia force threshold set in advance with each other, and if the difference value is greater than the inertia force threshold, determining that the rotation failure is present.

4. The rotary member inspection method according to claim 2, wherein
   the acquiring one or both of the difference value and the inertia force comprises acquiring a difference value between an inertia force immediately before the switching from the forward rotation to the reverse rotation of the rotary member and an inertia force immediately after the switching, and
   the determining whether the rotation failure is present comprises comparing the acquired difference value between the inertia forces and an inertia force threshold set in advance with each other, and if the difference value is greater than the inertia force threshold, determining that the rotation failure is present.

5. A rotary member inspection apparatus configured to inspect a rotation operation of a rotary member, the rotary member being configured to rotate about a rotation shaft, the rotary member inspection apparatus comprising:
   a driving unit configured to cause the rotary member to rotate in a forward rotation direction and a reverse rotation direction;
   a detector configured to detect one or both of a rotating torque of the rotary member and an inertia force of the rotary member; and
   a determination unit configured to determine whether a rotation failure of the rotary member is present based on one or both of a difference value between a rotating torque at a time of forward rotation of the rotary member and a rotating torque at a time of reverse rotation of the rotary member, and an inertia force at a time of switching from the forward rotation to the reverse rotation of the rotary member, the difference value being acquired based on values detected by the detector, the inertia force at the time of the switching from the forward rotation to the reverse rotation of the rotary member being acquired based on values detected by the detector.

6. The rotary member inspection apparatus according to claim 5, further comprising
   a calculation unit, wherein
   the detector comprises a torque detector configured to detect the rotating torque of the rotary member, and
   the calculation unit is configured to calculate the inertia force of the rotary member based on the rotating torque detected by the torque detector.

7. A rotary member inspection apparatus configured to inspect a rotation operation of a rotary member, the rotary member being configured to rotate about a rotation shaft, the rotary member inspection apparatus comprising:
   a motor configured to cause the rotary member to rotate in a forward rotation direction and a reverse rotation direction;
   a torque transducer configured to detect one or both of a rotating torque of the rotary member and an inertia force of the rotary member; and
   circuitry configured to determine whether a rotation failure of the rotary member is present based on one or both of a difference value between a rotating torque at a time of forward rotation of the rotary member and a rotating torque at a time of reverse rotation of the rotary member, and an inertia force at a time of switching from the forward rotation to the reverse rotation of the rotary member, the difference value being acquired based on values detected by the torque transducer, the inertia force at the time of the switching from the forward rotation to the reverse rotation of the rotary member being acquired based on values detected by the torque transducer.

\* \* \* \* \*